July 10, 1923.  1,461,694

J. BURKLEY

LIFTING DEVICE

Filed Feb. 13, 1922

WITNESSES

INVENTOR
JOSEPH BURKLEY
BY
ATTORNEYS

Patented July 10, 1923.

1,461,694

UNITED STATES PATENT OFFICE.

JOSEPH BURKLEY, OF TREADWELL, NEW YORK.

LIFTING DEVICE.

Application filed February 13, 1922. Serial No. 536,215.

*To all whom it may concern:*

Be it known that I, JOSEPH BURKLEY, a citizen of the United States, and a resident of Treadwell, in the county of Delaware and State of New York, have invented new and useful Improvements in Lifting Devices, of which the following is a full, clear, and exact description.

This invention relates to improvements in lifting devices primarily designed for use as a kitchen utensil.

The general object of this invention is the provision of a lifting device which may be positioned in a cooking utensil to support the article of food being cooked so that after the cooking has been completed the article of food may be removed from the cooking utensil, retaining it in its original shape.

A further object is the provision of a lifting device which may be inserted into a cooking utensil to engage an article of food being cooked to remove the same without destroying its original shape.

These and other objects of the invention will be more fully understood from the following detailed description and accompanying drawings, of which—

Figure 1:
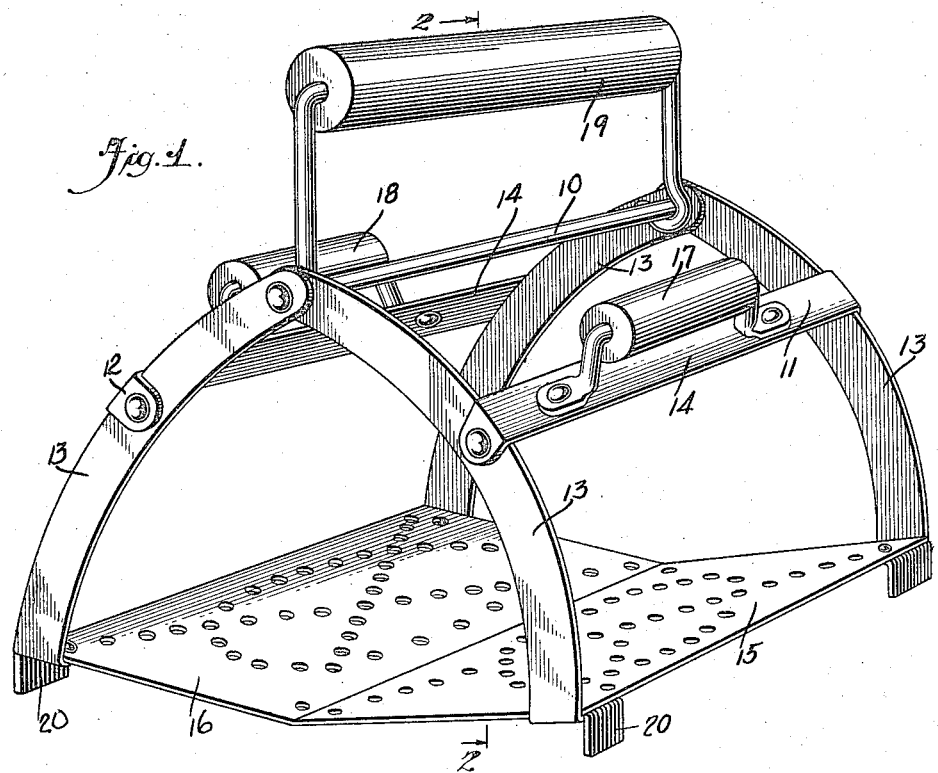
Figure 1 is a perspective view of the lifting device.
Figure 2:
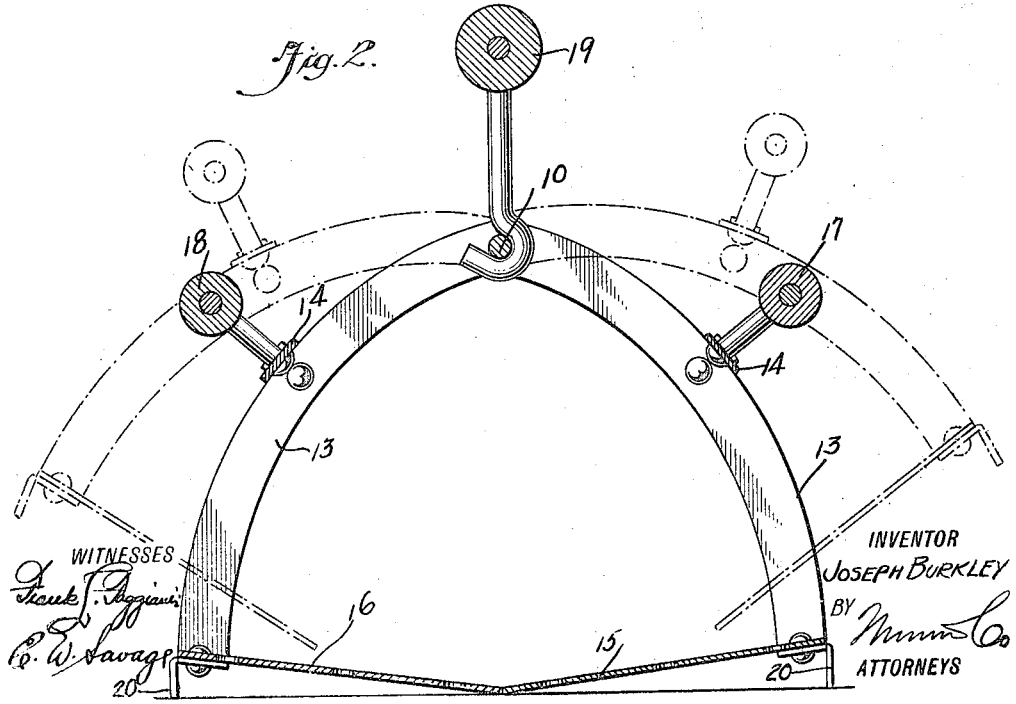
Figure 2 is a section along the line 2—2, Figure 1.

Referring to the above mentioned figures, a rod 10 is shown on which two sets of arms 11 and 12 are pivotally mounted. As shown in the preferred form illustrated in Figures 1 and 2, each set of arms consists of two or more plates 13 having their upper ends pivotally mounted on the rod 10 and provided with a brace 14 which serves to hold them spaced from one another. Attached to the lower ends of each set of arms 11 and 12 are perforated plates 15 and 16, respectively. The inner edges of these plates engage with one another and serve to form a continuous platform on which the food may be positioned, and serve to space the lower ends of the two sets of arms apart. The concave faces of the plates 13 face inward and thus an arch is formed over the continuous platform composed of the plates 15 and 16 which will allow articles of considerable size to be positioned upon the platform.

Handles 17 and 18 are mounted on the bracing members 14. These handles may be made of a variety of constructions but the preferred form as shown is an ordinary metal support with a wooden roller mounted thereon. The handle 19 for moving the lifting device is removably mounted on the rod 10. Means might be provided with this handle for retaining it in a vertical position. This is also accomplished, as shown in the drawings, by mounting the ends of the resilient depending arms of the handle so that they press against the arms 13, and the friction between them is sufficient to retain the handle in its vertical position. Legs 20 are mounted on the bottom of the porforated plates 15 and 16 to support the device so that the plates will be out of engagement with the surface of the object on which the device may be positioned.

When the lifting device is supported by the handle 19, the weight of the arms and the plates is sufficient to retain the plates in engagement with one another, thus forming a continuous platform. When it is desired to place this lifting device in a cooking utensil to support food, the article of food is placed on the platform formed by the plates 15 and 16. The weight of these plates in conjunction with the arms is sufficient to maintain the continuous platform and after the food has been removed from the cooking utensil the device may be operated to deposit the article of food on a platter or the like by the drawing of the plates outward, rotating the two sets of arms about the rod 10 by the use of the handles 17 and 18. In using the lifting device for removing articles from the cooking utensil after it has been cooked, the device is operated by means of the handles to slide the plates 15 and 16 under the article of food. After the plates have been forced underneath the article of food the lifting device may be removed by means of the handle 19 as the plates will be retained in engagement with one another due to their own weight.

I would state in conclusion that while the illustrated example constitutes a practical embodiment of my invention I do not limit myself strictly to the exact details herein illustrated since manifestly the same can be considerably varied without departing from the spirit of the invention as defined in the appended claim:

A utensil for handling articles of food, comprising two sets of arc-shaped arms, a rod projecting through the upper ends of said arc-shaped arms pivotally connecting them together, rigid members connecting each pair of arc-shaped arms, a perforated plate attached to the lower ends of each set of arms, the inner edges of the plates contacting, forming a continuous platform when in normal position, handles attached to the rigid members mounted on the arc-shaped arms presenting a means for operating the pairs of arms, and a handle provided with hook members for detachably engaging the rod joining the upper ends of the arc-shaped arms for lifting the device.

JOSEPH BURKLEY.